(No Model.)  3 Sheets—Sheet 1.
E. HOLTHAUS.
APPARATUS FOR TREATING GARBAGE.
No. 550,323. Patented Nov. 26, 1895.
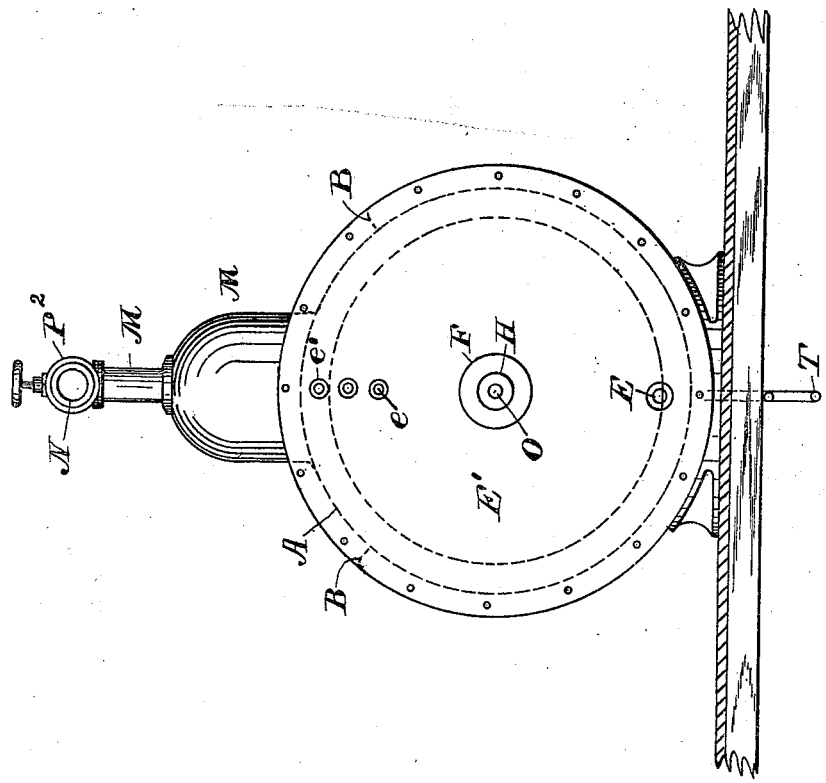

(No Model.) 3 Sheets—Sheet 2.
E. HOLTHAUS.
APPARATUS FOR TREATING GARBAGE.
No. 550,323. Patented Nov. 26, 1895.
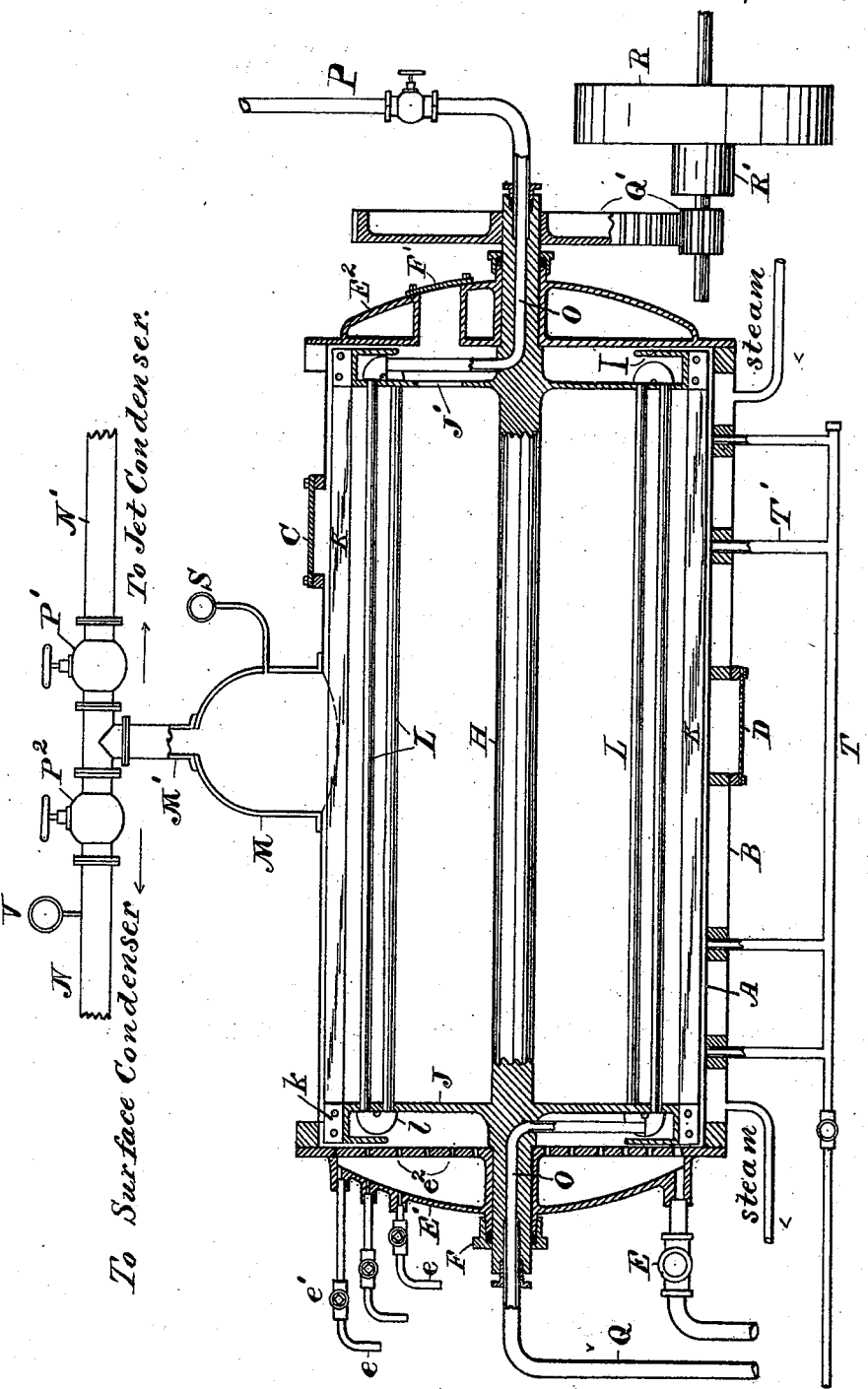
Attest:
Edw. F. Kinsey.
Jacob Marx.
Inventor.
Emil Holthaus, per
Thomas S. Crane, Atty.

(No Model.) 3 Sheets—Sheet 3.

E. HOLTHAUS.
APPARATUS FOR TREATING GARBAGE.

No. 550,323. Patented Nov. 26, 1895.

Attest:
Edw. F. Kinsey.
Jacob Marx.

Inventor.
Emil Holthaus, per
Thomas S. Crane, Atty.

UNITED STATES PATENT OFFICE.

EMIL HOLTHAUS, OF CANARSIE, NEW YORK, ASSIGNOR TO CYRUS C. CURRIER, OF NEWARK, NEW JERSEY.

APPARATUS FOR TREATING GARBAGE.

SPECIFICATION forming part of Letters Patent No. 550,323, dated November 26, 1895.

Original application filed May 9, 1894, Serial No. 510,620. Divided and this application filed October 6, 1894. Serial No. 525,062. (No model.)

*To all whom it may concern:*

Be it known that I, EMIL HOLTHAUS, a citizen of the United States, residing at Canarsie, Kings county, New York, have invented certain new and useful Improvements in Apparatus for Treating Garbage, fully described and represented in the following specification and the accompanying drawings, forming a part of the same.

This invention relates to a process and apparatus for drying garbage to render the same odorless and transportable and at the same time to recover any ammonia and grease contained therein.

In practicing the process the garbage is confined in a tight steam-jacketed vessel, and the vapors and gases which are produced during the treatment are condensed by suitable apparatus, so that nothing whatever is discharged into the atmosphere. A solvent, as naphtha, may be injected to dissolve the grease and the naphtha recovered for future use by condensing its vapor. The residuum, after the removal of the grease and ammonia, is thoroughly dried in the same vessel and is then adapted for transportation or for use in the manufacture of a fertilizer.

The apparatus consists of a steam-jacketed shell having suitable heads through which an axle is extended and connected with steam inlet and outlet pipes by swivel-joints, the axle having flanges inside the shell-carrying a series of longitudinal stirrers and a series of heating-pipes, which are connected with the inlet and outlet of the axle.

The bottom of the shell is provided with inlet-pipes to supply a solvent, as naphtha or sulphuric acid, and the shell is connected with a surface-condenser for the purpose of recovering the ammonia or any naphtha which may be used as a solvent in treating the garbage. A water-cock is provided near the bottom of the apparatus to draw off any water, and grease-cocks are provided near the top to draw off the liquid grease, and the shell is connected with a jet-condenser to absorb the fumes which are generated in drying the material.

The construction of the apparatus will be understood by reference to the annexed drawings, in which—

Figure 4:
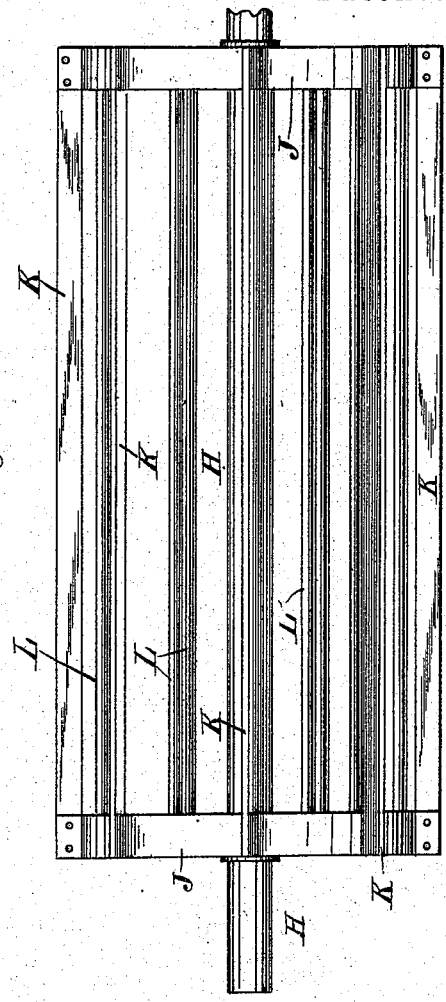
Figure 3:
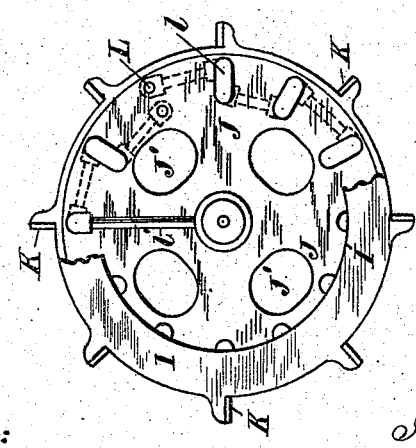

Figure 1 is an end elevation of the apparatus. Fig. 2 is a longitudinal section of the apparatus where hatched at the center line of the apparatus. Fig. 3 is an end view of the shaft with the stirrer and pipes attached, the return-flange being partly broken away; and Fig. 4 is a side view of the same parts with one end of the shaft broken off for want of space upon the drawings.

A designates the shell, around the lower two-thirds of which a steam-jacket B extends. The material lies in the lower part of the shell, and by confining the jacket to the same I avoid the unnecessary use and condensation of steam. The shell has a manhole C for admitting and a manhole D for discharging the material.

The heads are designated E' and E² and are provided with stuffing-boxes F, through which an axle or shaft H is extended. The ends of the shaft are formed with steam-ducts O and are connected, respectively, by swivel-joints with a steam-inlet pipe P and a steam-outlet pipe Q.

The shaft is provided close to the ends of the shell with flanges or disks J, one of which is provided with a series of manholes J'. The flanges are provided with return-flanges I and are formed upon their periphery with radial lugs $k$, and stirrers K are extended longitudinally from one flange to the other, forming stirrers which are rotated by the flanges close to the interior of the shell.

A series of longitudinal pipes L are extended between the flanges and through holes in the same adjacent to the stirrers K, and the pipes are connected at the ends by return-bends $l$, the series forming a continuous heating-coil, the opposite ends of which are connected by pipes $l'$ with the ducts O, and thus in communication with the steam inlet and outlet as the shaft revolves.

The casing for a charge of four or five tons would be six feet in diameter and thirteen feet long, and to give suitable strength to the heads they are shown dome-shaped and hollow, and one of the heads is provided at the bottom with a water-cock E and near the top with a series of grease-pipes e, provided with cocks e', the grease-pipes being at different levels to facilitate the removal of the liquid grease from the surface of the water within the shell.

The head which is supplied with the discharge-pipes is formed upon its inner plate with perforations $e^2$ to admit the liquid to such pipes. The opposite head $E^2$ is provided with a manhole and cover F in line with the man-openings J' in the flange J, thus affording access within the pipes L to adjust or repair the same. A supply-pipe T is connected with the bottom of the shell through the steam-jacket by pipes T' to inject a solvent into the material under treatment.

A dome M connects with the top of the shell and is provided with pipe M', having branches N and N' to connect, respectively, with a surface-condenser and a jet-condenser, the latter being adapted to condense the gaseous fumes discharged from the material in drying the same, while the former is adapted to recover the ammonia or volatile solvent discharged at different stages of the treatment. The pipes N N' are provided, respectively, with cocks $P^2$ P' to connect with the condensers in turn. The shaft or axle H is shown provided with gearing Q', connecting it with a pair of driving-pulleys R R', which are adapted to rotate it, respectively, at about three revolutions and twelve revolutions per minute.

The apparatus is used as follows: A charge of garbage is inserted through the manhole C and the casing is filled to a suitable level with water to properly cook the same, all the cocks then being closed, and the shaft with its stirrers K and pipes L being rotated at the slower speed for about five hours. The material is subjected not only to the heat of the steam-jacket B, but is continually intersected and broken up by the series of heating-pipes L, which are rotated with the stirrers. The heat generates a pressure within the shell of about forty pounds per square inch, which pressure may be regulated by a pressure-gage S upon the dome. The cock $P^2$ is opened from time to time to condense any ammonia that is discharged from the material, and when the cooking is completed the liquid grease which rises to the surface of the water is drawn off through the pipes e, and the water is then wholly discharged from the shell by the cock E. The grease which is not removed by the treatment with water may then be completely extracted by injecting naphtha through the pipes T', the material being then treated for another hour, with connection to a surface-condenser, (not shown,) to recover the naphtha, which is wholly vaporized during the process. The cock $P^2$ is then closed and the cock P' opened to connect the shell with a jet-condenser, (not shown,) and the material is then dried by rotating the shaft and stirrers at the higher rate of speed for about thirty minutes, the jet-condenser operating to absorb the fumes which are generated in such drying operation. The progress of the treatment in its different stages is readily tested through a suitable opening in the shell, and the material when thoroughly dried is ready for discharge in an odorless condition. The water which is mixed with the garbage and afterward drawn from the shell may be mixed with the succeeding charge.

For treating the garbage of a city several of the apparatus would be required, and the water discharged from one of the shells, as well as the naphtha recovered by the condenser, would be used over again. The valuable substances extracted in the water would thus be utilized and concentrated in the successive charges. Where it is desired to utilize the material in the manufacture of fertilizers, it may be treated with sulphuric or other mineral acids, and is thus adapted for combination with lime and analogous materials.

It will be understood from the above description that no vapors or fumes are discharged from the apparatus at any stage of the treatment, and the process is entirely odorless and all the products of value are preserved.

I am aware that upright rendering-tanks have been provided with cocks at different levels to draw off the grease, and I do not, therefore, claim such cocks as my invention; but I believe it is entirely new to furnish a horizontal cylinder for the treatment of garbage with manholes to introduce and remove the material and with heads having stuffing-boxes for the stirring-shaft, and provided, also, with the series of grease-cocks and the pipe for drawing off the water near the bottom of the cylinder.

In drying apparatus having the heating appliances carried by the shaft it has not been common heretofore to support a connected series of pipes upon the shaft to revolve therewith and to unite the ends of such series, respectively, with independent passages in the ends of the shaft.

U-shaped pipes have been applied to a hollow revolving shaft by inserting the ends of the loop in the shaft, but such loops receive the circulation separately, and they also serve to sustain the stirring devices, which imposes a considerable strain upon the pipe-joints. In my construction the pipes are not compelled to support anything, but are mounted upon the shaft by unperforated or independent arms, heads, or supports, which sustain all the strain, and the ends of the series of pipes are connected to the inlet and outlet passages by tubes which serve only for the circulation of the heated fluid. My construction is thus very durable and easily constructed and repaired.

Having thus set forth the nature of my invention, what is claimed herein is—

1. An apparatus for treating garbage, comprising a horizontal cylindrical receptacle for the garbage, with shaft extended through the cylinder and provided with disconnected inlet and outlet passages in its opposite ends and with suitable supports carrying stirrers in proximity to the wall of the cylinder, and a series of heating pipes carried by the said arms or supports and connected together in series, with each end of the series having a single connection to the inlet or outlet passage, to secure a positive circulation through the said pipes, as and for the purpose set forth.

2. An apparatus for treating garbage, comprising a horizontal cylindrical receptacle for the garbage with manhole to insert the material, the cylinder shell having means for discharging gases and suitable heads provided with stuffing boxes, the shaft H having the passages O connected respectively with inlet and outlet pipes P and Q, and a series of exposed heating pipes carried by the shaft and extended parallel with the same, and swept through the material by the rotation of the shaft, and the pipes being connected in series with the passages O, the whole arranged and operated substantially as herein set forth.

3. An apparatus for treating garbage, comprising a horizontal cylindrical shell having means for discharging gases, and suitable heads provided with stuffing boxes, the shaft H having the passages O connected respectively with inlet and outlet pipes P and Q, flanges attached to the shaft near the heads of the cylinder, and a series of pipes carried by the flanges and connected in series with the passages O, and adapted to agitate and heat the material when the shaft is rotated.

4. An apparatus for treating garbage, comprising a cylinder shell having means for discharging gases and suitable heads provided with stuffing boxes, a shaft extended through the stuffing boxes with inlet and outlet for steam, the flanges J provided with the stirrers K, and heating pipes secured to the shaft parallel with the same and carried through the material with the stirrers, and such pipes being connected with the steam inlet and outlet, the whole arranged and operated substantially as set forth.

5. An apparatus for treating garbage, comprising the horizontal cylindrical shell A having suitable heads provided with stuffing boxes and means for discharging the gases, the steam jacket B extended around the lower two thirds of the shell, the shaft H having the passages O connected respectively with inlet and outlet pipes P and Q, and heating pipes secured to the shaft and carried through the material by the rotation of the shaft, such pipes being connected with the passages O, and the whole arranged and operated substantially as set forth.

6. An apparatus for treating garbage, comprising the horizontal cylindrical shell A having manhole for the insertion and removal of the material, heads provided with stuffing boxes F, means for discharging gases, a shaft extending through the stuffing boxes and provided with the stirrers K to agitate the material within the shell, and one of the heads being provided with the inner plate having the perforations $e^2$ and a series of grease pipes $e$ arranged at different levels upon the upper half of the head, and provided with the cocks $e'$ for drawing off the grease at different levels, substantially as set forth.

7. An apparatus for treating garbage, comprising a horizontal cylindrical shell having suitable heads provided with stuffing boxes, a rotary shaft with stirrers inside the shell, and one of the heads being provided with a chamber having a screen upon its inner side, and upon its outer side a series of grease pipes arranged at different levels and provided with cocks to open the same at pleasure.

8. An apparatus for treating garbage, comprising a horizontal cylindrical shell having suitable heads provided with stuffing boxes, a rotary shaft with stirrers inside the shell, and one of the heads being formed with a chamber having a screen upon its inner side perforated from the top to the bottom of the chamber, and upon its upper half a series of grease pipes arranged at different levels, and provided with suitable cocks to open the same at pleasure, and upon its lower half a water pipe to introduce or discharge water, substantially as herein set forth.

9. An apparatus for treating garbage, comprising the cylindrical shell A having suitable heads provided with stuffing boxes F, the shaft H having the passages O in the ends and extended through the heads and connected with the steam pipes P and Q, the flanges J attached to the shaft and carrying the stirrers K, and provided with the series of pipes L extended through the flanges and joined at their ends by return bends, and the pipes L being connected in series with the passages O, and the shell A being provided with pipes N and N' for connection to surface and jet condensers, and suitable cocks to connect the shell at pleasure with either of the said condensers, substantially as herein set forth.

10. An apparatus for treating garbage, comprising the horizontal cylindrical shell A having suitable heads with stuffing boxes F, the shaft H extended through the heads and provided with the flanges J, and having the passages O connected with the steam pipes P and Q, the series of pipes L extended through the flanges and joined at their ends by return bends $l$, and connected in series with the steam passages in the ends of the shaft, and the flanges J being provided with the return flanges I to cover the return bends, as herein set forth.

11. An apparatus for treating garbage, comprising the horizontal cylindrical shell A having the steam jacket B, the head $E^2$ provided with stuffing box F and manhole F', the head E' provided in the upper part with the series of grease pipes $e$ and in the lower part with the water pipe having cock E, the shaft H extended through the heads and having the passages O connected with the steam pipes P and Q, the flanges J carrying the series of scrapers, and the heating pipes L connected in a series with the passages O, and the shell being provided with the pipes N and N' for connection to surface and jet condensers, and suitable cocks to connect the shell at pleasure with either of the said condensers, substantially as herein set forth.

In testimony whereof I have hereunto set my hand in the presence of two subscribing witnesses.

EMIL HOLTHAUS.

Witnesses:
EDW. F. KINSEY,
L. LEE.